(12) United States Patent
Sogame et al.

(10) Patent No.: US 6,233,880 B1
(45) Date of Patent: May 22, 2001

(54) DEPLOYABLE STRUCTURE

(75) Inventors: Akito Sogame; Jun Saito, both of Yamato (JP)

(73) Assignee: Nishimatsu Construction Co., Ltd., Tokyo (JP)

( * ) Notice: Subject to any disclaimer, the term of this patent is extended or adjusted under 35 U.S.C. 154(b) by 0 days.

(21) Appl. No.: 09/170,166

(22) Filed: Oct. 13, 1998

(30) Foreign Application Priority Data

Dec. 3, 1997 (JP) .................................................... 9-333154

(51) Int. Cl.[7] ...................................................... E04H 9/00
(52) U.S. Cl. .............................. 52/79.5; 52/81.2; 52/245
(58) Field of Search ............................... 52/245, 71, 79.5, 52/81.2, 646, 653.1

(56) References Cited

U.S. PATENT DOCUMENTS

| | | | |
|---|---|---|---|
| 3,524,288 | * 8/1970 | Coppa | 52/71 |
| 4,145,850 | * 3/1979 | Runyon | 52/71 |
| 5,216,763 | * 6/1993 | Grenier | 4/527 |

FOREIGN PATENT DOCUMENTS

| | | |
|---|---|---|
| 62-271842 | 11/1987 | (JP) . |
| 9-242987 | 9/1997 | (JP) . |

* cited by examiner

Primary Examiner—Carl D. Friedman
Assistant Examiner—Kevin McDermott
(74) Attorney, Agent, or Firm—Oliff & Berridge, PLC

(57) ABSTRACT

A deployable structure comprising a side wall having a plurality of segments which make the side wall a tube-like shape as a whole. Four adjacent segments are connected with one another at one point to make one module. The folding patterns of the segments along the connecting creases have two purposes, one of which is a closing pattern to reduce an inner angle between connected segments adjacent in a circumferential direction of the side wall, accompanied with a folding in a direction of a central axis, the other of which is an opening pattern to enlarge the inner angle between connected segments adjacent in the circumferential direction of the side wall, accompanied with a folding in the direction of the central axis. As a result the side wall can be deployed and packaged in both directions of the central axis and the radius of the side wall by folding the segments along the connecting creases thereof in the closing and opening patterns.

14 Claims, 14 Drawing Sheets

($d_{max}=4$)

($k=6$, $d_{max}=4$)

(k=6, d$_{max}$=4)

DEPLOYABLE STRUCTURE

BACKGROUND OF THE INVENTION

1. Field of the Invention

The present invention relates to a deployable structure which is tube-like to have a closed area, for example, in space, on the surface of the moon, on the earth, or the like.

2. Description of Related Art

A tube-like structure having a side wall to create a closed area in space, as on the surface of the moon, the earth, or the like has been known. It is required that such a tube-like structure be deployable and packagable, for example, in point of transportation or the like. Some tube-like deployable structures have been proposed to satisfy the requirements above-described, in earlier technology. For example, a tube-like structure, the side wall of which enables deployment and packaging in a longitudinal direction, i.e., in a direction of a center axis of the tube-like structure, has been known.

However, the earlier tube-like structures enable deployment and packaging only in the longitudinal direction. That is, the earlier tube-like structure is not deployable in a lateral direction.

SUMMARY OF THE INVENTION

The present invention has been developed in view of the problem.

An object of the present invention is to provide a deployable structure, e.g., a tube-like deployable structure having folding patterns which enable deployment and packaging of the deployable structure in a large degree or with various additional effects.

In order to accomplish the above objects, in accordance with one aspect of the invention, a deployable structure is provided which comprises a side wall having a plurality of segments which makes the side wall take on a tube-like shape, wherein the connecting creases of at least four adjacent segments are connected with one another at one point, and the folding patterns of the segments along the connecting creases have two patterns, one of which is a closing pattern to reduce an inner angle between connecting creases of segments adjacent in a circumferential direction of the side wall as accompanied with a folding in a direction of a central axis, the other of which is an opening pattern to enlarge the inner angle between connecting creases of segments adjacent in the circumferential direction of the side wall as accompanied with a folding in the direction of the central axis. The side wall can be deployed and packaged in both directions of the central axis and radius by folding the segments along the connecting creases thereof in the closing and opening patterns described. The side wall can therefore comprise a locus of a closed curve, moving along the central axis.

According to the deployable structure of the present invention, when the side wall is folded in the direction of the central axis, the side wall is also folded in the radial direction, i.e., a perpendicular direction against the central axis, by functions of the opening and closing patterns. As a result, because it is possible to carry out the three-dimensional deployment and packaging of the deployable structure, i.e., in the directions of the central axis and radius thereof , it is also possible to enlarge the degree of deployment and packaging of the deployable structure.

Therefore, it is possible to make use of space efficiently, for example, when the deployable structure is transported, or otherwise temporarily placed on a storage place.

The shape of the deployable structure may be cylindrical, which is in a plane, i.e., in a cross section approximately circular having a central axis which is a straight line, for example. However, it is not limited to this. The deployable structure may have another shape of, for example, a triangle, a polygon or the like in plane. The axis of the deployable structure may be a straight line, however, it is not limited to this, as the axis can be a curve or the like.

The segments may be folded in various combinations of patterns. For example, the segments may be folded in the closing pattern and the opening pattern alternately in the circumferential direction. The segments may be also folded by the opening pattern continuously and the closing pattern continuously without alternating with each other. The number of the opening pattern and the closing pattern may be different from each other.

The closing pattern and the opening pattern may be continued in the direction of the central axis, respectively. As a result, it is possible to smoothly fold the side wall as a whole.

The side wall may comprise modules of a determined number of segments which may be connected to one another in the direction of the central axis and the circumferential direction. A module can comprise four segments that is folded in closing pattern, and two segments adjacent in the circumferential direction can be approximately the same length in the circumferential direction. The module can be folded to have an angle so that both upper and lower ends of one side of the module, which is parallel with the central axis, may be approximately brought into contact with a center of the other side of the module, as viewed in the direction of the central axis when the deployable structure is in a folded state.

According to the deployable structure, in particular, it is possible to raise the efficiency of the packaging of the side wall as a whole, as described later. When the side wall is folded and packaged, projections form by folding of the modules, which is the same number of modules in the circumferential direction as arranged in radiated shape in plane. When the deployable structure is in most folded state in the direction of the central axis, the module can be folded to have an angle so that both upper and lower ends of one side of the module, which is parallel with the central axis, are approximately brought into contact with a center of the other side of the module, as viewed in the direction of the central axis. As a result, it is possible to shorten the length in the radial direction of the deployable structure.

Because the folding angle of the module can be an acute angle so that both upper and lower ends of one side of the module, which is parallel with the central axis, are approximately brought into contact with the center of the other side of the module, it is possible to minimize a length in the radial direction of the deployable structure. When both upper and lower ends of one side of the module are overlapped with the center of the other side of the module, the degree of the folding of the deployable structure can be reduced in the direction of the central axis. That is, both end portions of the module are already in the double overlapped state due to overlapping with the adjacent module in the circumferential direction, because both end portions of the module are connected with the adjacent module and folded in closing pattern. Accordingly, both end portions of the module will be in quadruple overlapped state, i.e., eight segments will be overlapped, when the folding angle of the module is more acute which makes both end portions of the module overlap each other. The difference of degree of the folding of the side wall between a case where the side wall has quadruple overlapping and a case where the side wall has double overlapping of the segments is twice in the direction of the central axis, because the segments have some thickness.

However, according to the deployable structure of the invention, because both end portions of the module may be not overlapped but are approximately brought into contact with each other as viewed in the direction of the central axis, the packaging efficiency of the deployable structure in the direction of the central axis is also raised. Therefore, the packaging efficiency of the deployable structure as a whole in the three dimensional point of view is raised the most.

The module may comprise a portion wherein the first to third segments successively connected in the circumferential direction are connected to each other to make two rows along the circumferential direction of the side wall. In this case, the module may be folded in the closing pattern between the first segment and the second segment, while the module may be folded in the opening pattern between the second segment and the third segment. Moreover, a folding angle between the first and second segments may be maximum so that the second segments are approximately overlapped with the first segments when a degree of the folding of the deployable structure in the direction of the central axis is maximum.

According to the deployable structure, in particular, it is possible to raise the packaging efficiency of the deployable structure in the radial direction of the side wall as well. That is, because the second segments are approximately overlapped on the first segments when the deployable structure is folded and packaged, it is possible to reduce a perimeter of the side wall. Therefore, it is also possible to reduce the length in the radial direction of the side wall by the same amount as that of the overlapped length.

Furthermore, according to the side wall of the deployable structure above-described, it is possible to obtain a relatively large inner space when the side wall is folded and packaged. That is, because the reduction of the length in the radial direction above-described is carried out not by pushing the segments into a center portion of the deployable structure but by folding and overlapping some segments to each other, it is possible to ensure the inner space of the side wall.

The side wall may comprise at least one unit having a ring shape, in which a determined number of modules are connected. The unit may be one or a plurality.

The deployable structure may comprise a shape which is axially symmetric when the deployable structure is in a packaged state as viewed in the direction of the central axis. The maximum number of overlapping segments may be either not more than four for one unit, or more than four for one unit.

According to the deployable structure, when the maximum number of the overlapped segments is not more than four, it may be possible to reduce the thickness of the overlapped portions of the tube-like deployable structure.

According to the tube-like deployable structure, when the maximum number of the overlapped segments is more than four, it may be possible to reduce the radius of the packaged tube-like deployable structure because the maximum number of the overlapped segments may be more than four.

The deployable structure may comprise a shape which is rotationally symmetric around the central axis of the deployable structure when the deployable structure is in a packaged state, having an inside edge and an outside edge. The inside and outside edges may be either parallel or not parallel to each other when the deployable structure is in the packaged state.

The deployable structure is not limited to the symmetric types when the deployable structure is in a packaged state. The deployable structure may be an unsymmetric type as well.

The deployable structure may be applied as a dust shield for protecting a space system. However, it is not limited to this. The deployable structure may also be applied to lunar base structures or the like.

In accordance with another aspect of the invention wherein the deployable structure has a side wall, the side wall comprises at least one unit having a ring shape and a plurality of modules connected in a circumferential direction of the side wall to make the ring shape, wherein each module comprises at least four connected segments to make two rows along the circumferential direction of the side wall, with the sides of the at least four segments being connected with one another at one point. The segments in a development state can be folded along the connecting creases in both directions of a central axis and a radius of the side wall, in a closing pattern to reduce an inner angle between sides of segments adjacent in the circumferential direction, accompanied with a folding in the direction of the central axis, and in an opening pattern to enlarge the inner angle between segments adjacent in the circumferential direction, accompanied with folding in the direction of the central axis.

According to the deployable structure of the present invention, the side wall can be folded in both directions of the central axis and the radius of the side wall, by functions of the closing pattern, which reduces the inner angle between the connected segments adjacent in the circumferential direction, and the opening pattern, which enlarges the inner angle between the connected segments adjacent in the circumferential direction of the side wall. As a result, it is possible to carry out the three-dimensional deployment and packaging of the deployable structure, i.e., in both directions of the central axis and radius of the side wall, to enlarge a degree of the deployment and packaging of the deployable structure. Therefore, it is possible to make use of spaces efficiently, for example, when the deployable structure is transported or otherwise temporarily accommodated in a storage space or the like.

BRIEF DESCRIPTION OF THE DRAWINGS

The above and other objects, features and advantages of the invention will become more apparent from the following description taken in conjunction with the accompanying drawings wherein like references refer to like parts and wherein:

FIGS. 6A to 6C show connected segments in steps of being folded by opening pattern: wherein FIG. 6A is a perspective view of a first step thereof; FIG. 6B is a perspective view of a second step thereof; and FIG. 6C is a perspective view of a third step thereof;

PREFERRED EMBODIMENT OF THE INVENTION

Embodiments of the deplorable structure, according to the present invention will be explained with reference to FIGS. 1 to 19, as follows.

Figure 1:
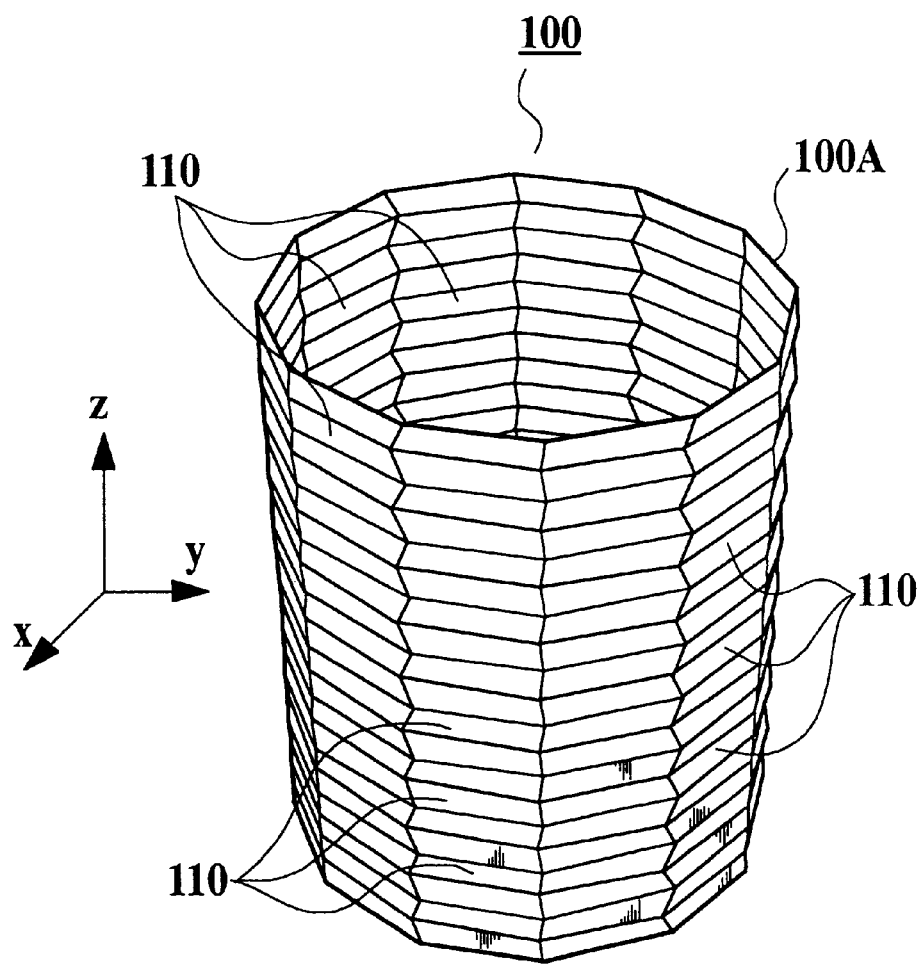
FIG. 1 is a perspective view of a tube-like deployable structure in a development state according to a first embodiment of the present invention.
Figure 2:
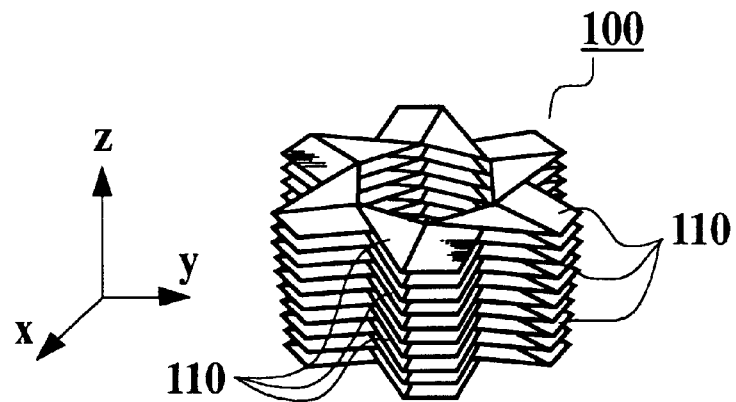
FIG. 2 is a perspective view of the tube-like deployable structure shown in FIG. 1, in a packaged state.
Figure 3:
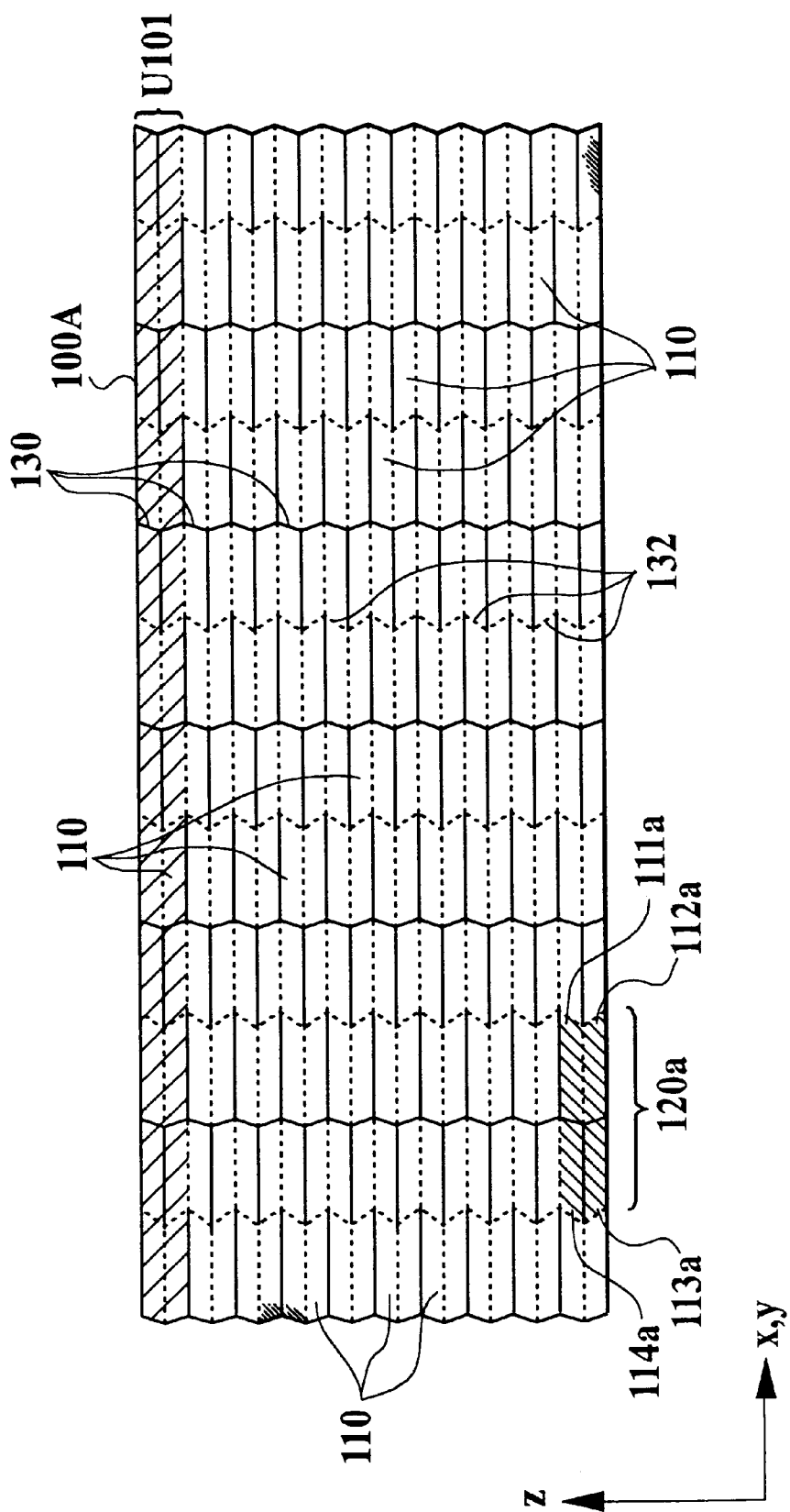
FIG. 3 is a plan development of the tube-like deployable structure shown in FIG. 1, for explaining folds formed on the wall thereof
Figure 4:
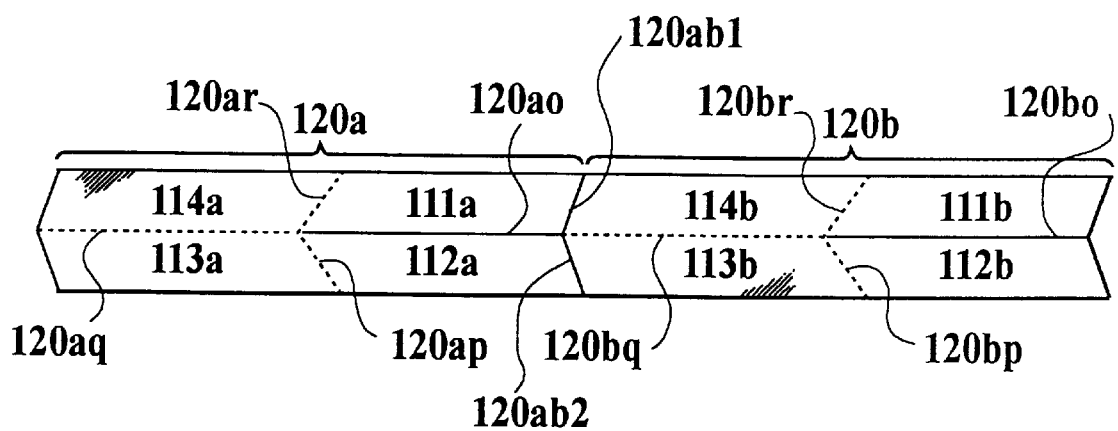
FIG. 4 is a partial diagrammatic view of the plan development shown in FIG. 3, showing two adjacent modules of the tube-like deployable structure.
Figure 5:
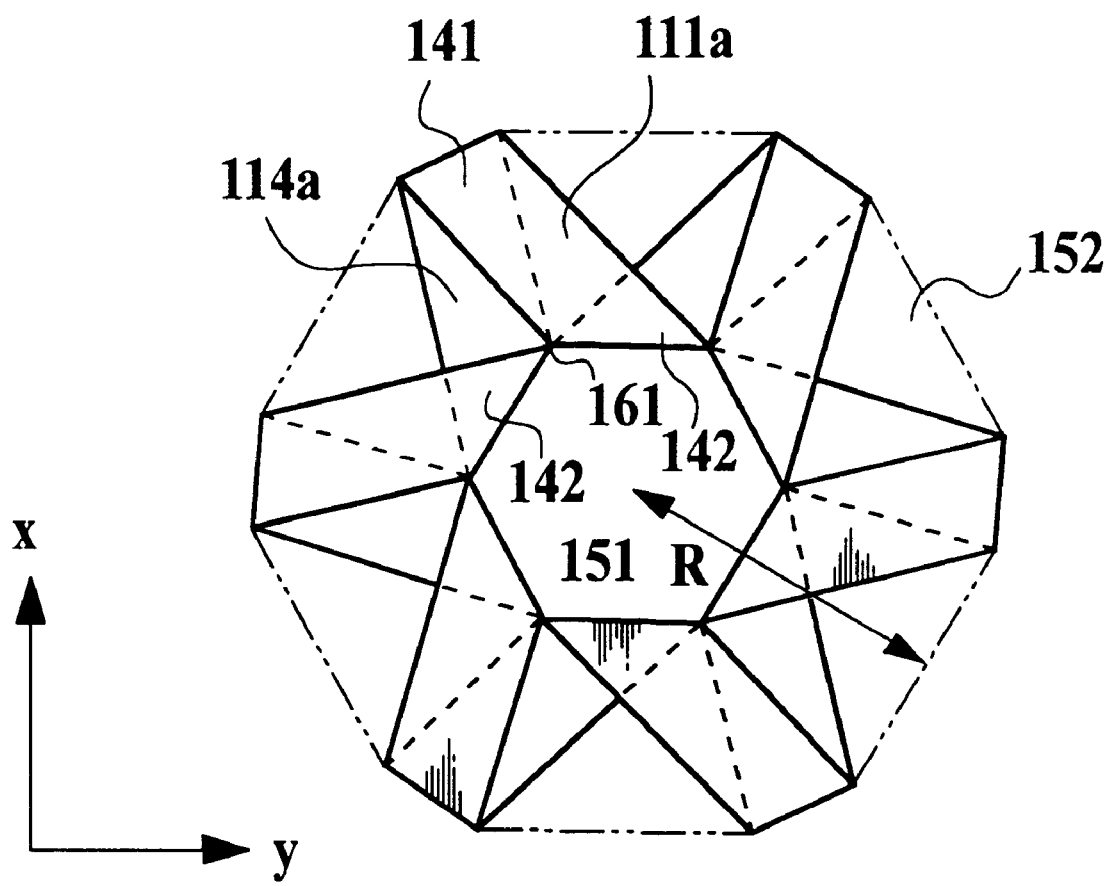
FIG. 5 is a top view of the tube-like deployable structure shown in FIG. 1, in a most packaged state.

A deployable structure according to a first embodiment of the invention will be explained with reference to FIGS. 1 to 6C. FIG. 1 is a perspective view of a tube-like deployable structure 100 in a development state according to the first embodiment of the present invention. FIG. 2 is a perspective view of the tube-like deployable structure 100 shown in FIG. 1, in a folded and packaged state. FIG. 3 is a plan development of the tube-like deployable structure 100 shown in FIG. 1, for explaining folds (creases) formed on the wall thereof. FIG. 4 is a partial diagrammatic view of the plan development shown in FIG. 3, showing two adjacent modules of the tube-like deployable structure 100. FIG. 5 is a top view of the tube-like deployable structure 100 shown in FIG. 1, in a most packaged state.

The tube-like deployable structure 100 is for forming a closed area which is surrounded by a side wall 100A, for example, in space, on the surface of the moon, on the earth, or the like. The closed area can be not only a completely closed area but also a semi-closed area which is open at both axial ends, i.e., at upper and lower ends, of the tube-like deployable structure 100.

The tube-like deployable structure 100 according to the first embodiment comprises a plurality of ring-shaped units which are successively connected one after another in a Z-axial direction. Reference numeral U101 denotes one unit. The Z-axial direction means a direction of the central axis of the ring, as shown in FIG. 1. Each unit comprises six modules which are connected in a circumferential direction which is parallel with a X-Y-plane, as shown in FIG. 1. The X-Y-plane is perpendicular to the Z-axis. The module 120a comprises four segments 111a, 112a, 113a, and 114a each of which has the shape of a quadrangle, and which are connected to one another through connecting creases 120ao, 120ap, 120aq, and 120ar. Each adjacent segment, has an approximately same length relative to each other in the circumferential direction. The four segments 111a, 112a, 113a, and 114a are arranged to form a matrix of 2×2 so that the four connecting creases 120ao, 120ap, 120aq, and 120ar intersect at one point, as shown in FIGS. 3 and 4. The module 120a can be folded along the connecting creases (creases) 120ao, 120ap, 120aq, and 120ar. The module 120a is folded in a closing pattern 130 to reduce the inner angle between the circumferential creases 120ao and 120aq of the right segments 111a or 112a and the left segments 113a and 114a, in the inner side of the ring unit on the X-Y-plane from approximately 180° to a smaller angle, accompanied with a folding in the Z-axial direction. Thus, the inner angle is the angle the segments, eg., 111a, 112a, 113a and 114a, form with reference to the interior of the tube-like deployable structure within the X-Y plane. Adjacent four segments 111a, 112a, 113b, and 114b of the two adjacent modules 120a and 120b of the unit, which are connected to each other in the circumferential direction of the side wall 100A are folded in an opening pattern 132 to enlarge the inner angle between the circumferential creases 120bq and 120ao of the right module 120b and the left module 120a, accompanied with a folding in the Z-axial direction. The folding in such a closing pattern forms a projecting portion of the folded star-shaped structure, as shown in FIG. 2. The folding in such a opening pattern forms a concave portion of the folded star-shaped structure. The opening patterns 132 alternate with the closing patterns 130 in the circumferential direction of the side wall 100A. The number of the modules and the projecting portions are the same. Thus, to fold the deployable tube-like structure from an open, erected state wherein all modules are at approximately 180°, then adjacent modules, e.g., 120a and 120b, each comprised of four segments 111a, 112a, 113a 114a, folds in one direction to reduce the inner angle from about 180° between the segments 111a, 112a, 113a and 114a towards 0°. At the same time, an adjacent module, eg., 120b, comprised of segments 111b, 112b, 113b and 114b folds in an inverse direction to enlarge the inner angle between segments 111b, 112b, 113b and 114b from about 180° to about 360°. As a result, adjacent modules, eg., 120a and 120b, and their respective segments overly one another in the folded state shown in FIG. 2 due to the connecting creases, eg. 120ab2 and 120ab1 between the two modules 120a and 120b.

By folding the connecting creases of the segments 110 in both Z-axial and radial directions of the side wall 100A simultaneously, it is possible to package the tube-like deployable structure 100 from approximately tube-like shape in a development state, as shown in FIG. 1 to a packaged state which is minimized in the Z-axial and the radial directions on the X-Y-plane, as shown in FIG. 2.

Two segments, the connecting side of which is illustrated with a dotted line, as shown in FIG. 3 are folded so that the connecting side is projected into a side of an inner space 151 of the side wall 100A. That is, two segments make a convex portion projected into the inner space 151. On the contrary, two segments, the connecting side of which is illustrated with a solid line are folded so that the connecting side is projected into a side of an outer space 152 of the side wall 100A. That is, two segments make a convex portion projected into the outer space 152.

The dotted lines which are parallel with the Z-axis show the opening pattern 132 of connecting portions, while the solid lines which are parallel with the Z-axis show the closing pattern 130 of the connecting portions, as shown in FIG. 3.

A way of folding by the opening pattern 132 will be explained with reference to FIGS. 6A to 6C, as follows.

Figure 6A:
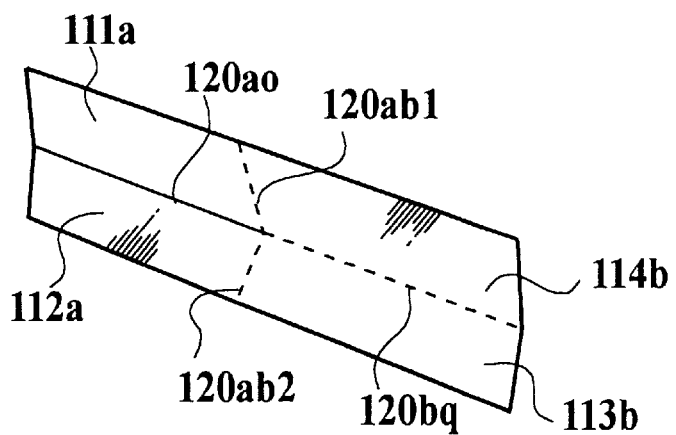
Figure 6B:
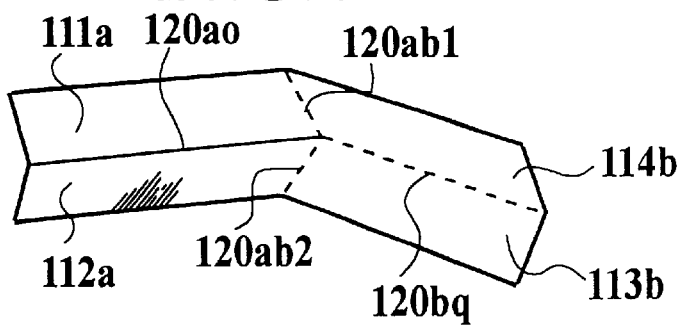
Figure 6C:
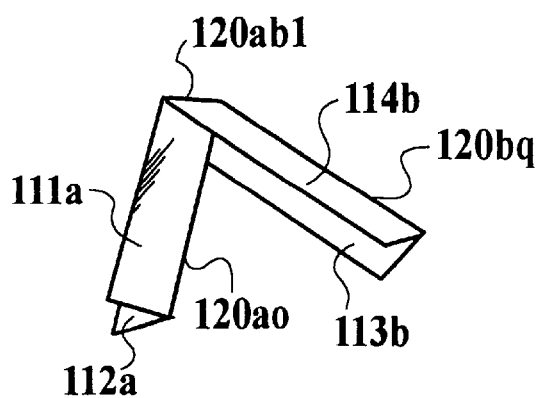

FIGS. 6A to 6C show the connected segments in steps of being folded by opening pattern 132, wherein FIG. 6A shows a development state of the connected segments, and FIGS. 6B and 6C show the connected segments in the steps of being folded in order.

The four segments, for example, 111a, 112a, 113b, and 114b are connected with one another in determined angles to have connecting creases 120bq, 120ab2, 120ao, and 120abl. Accompanied with first folding the segments oppositely in the Z axial direction along two connecting creases 120bq and 120ao which are extending opposite each other in a X-Y direction, two segments are then folded along two connecting creases 120abl and 120ab2 extending opposite each other in the Z-axial direction. Then, the inner angle between two connecting creases 120bq and 120ao changes with reference to the X-Y-plane from approximately 180° to a larger angle for segments 113b, 114b and to a smaller angle for segments 111a, 112a, for example. That is, two segments 111a and 112a fold to become convex relative to the outer space, while two segments 113b and 114b become convex relative to the inner space. The folding angle of the opening pattern 132 depends on the connecting angles of each connecting crease 120bq, 120ab2, 120ao, and 120abl in the development state. Accordingly, the folding angle can be changed by changing the connecting angles of each connecting creases 120bq, 120ab2, 120ao, and 120abl.

The segments are folded in closing pattern 130 along the connecting creases by folding the segments in the opposite direction of folding in the opening pattern 132 above-described.

The opening patterns 132 alternates with the closing patterns 130, along an approximately circular shape, i.e., along a line pivoting on the central axis of the tube-like deployable structure 100. The approximately circular shape is parallel with the X-Y-plane. The segments 110 form polygons in parallel with the X-Y-plane. The tube-like deployable structure 100 is folded in the Z-axial direction to reduce the inner angle between the connecting creases of segments adjacent in the circumferential direction in the closing pattern 130, while the tube-like deployable structure 100 is folded to enlarge the inner angles between that in opening pattern 132, simultaneously. As a result, summation of the inner angle is not changed, when the tube-like deployable structure 100 is folded.

When the tube-like deployable structure 100 is in its most packaged state in the Z-axial direction, the modules 120a comprising four segments 111a to 114a are folded so that upper end of the segment 111a and lower end of the segment 112a, of one side of the modules 120a are approximately in contact with a center between the segments 113a and 114a, of the other side of the module 120a at a point 161 looking in the direction of the central axis, as shown in FIG. 5. That is, the upper end of the segment 111a and the lower end of the segment 112a, of one side of the modules 120a are not overlapped with the center between the segments 113a and 114a, of the other side of the module 120a looking in the direction of the central axis. Mid-area 141 of the module 120a and both end portions 142 of the module are for being set to be a double overlapped portion of the segments, i.e., four segments of the module area overlapped, other portions of the module are for being set to be a single overlapped portion of the segments, i.e., two segments of the module are overlapped.

An inner excess space 151 is formed in the inner of the tube-like deployable structure 100, while other excess spaces 152 are created around the outer circumferential portions of the tube-like deployable structure 100, in the packaged state thereof. Although these excess spaces 151 and 152 otherwise use less voids, they do accommodate the tube-like deployable structure 100 when packaged. Hence, these excess spaces 151 and 152 are sure to be created.

As described above, according to the tube-like deployable structure 100 of the first embodiment, because the tube-like deployable structure 100 is folded in the radial direction accompanying the folding thereof in the Z-axial direction, i.e., in a direction of a determined axis, it is possible to carry out the three-dimensional deployment and packaging of the tube-like deployable structure 100. As a result, it is possible to enlarge a degree of the deployment and packaging of the tube-like deployable structure 100. Therefore, it is possible to make use of spaces efficiently when the tube-like deployable structure 100 is transported or otherwise temporarily stored in an accommodating space or the like, for example.

Further, because the folding angle of the module is set to make both end portions 142 of the module to be approximately contacting each other at the point 161, that is, both end portions 142 of the module are not overlapped with each other, it is possible to minimize a length in the radial direction of the tube-like deployable structure 100, under the condition that the overlapping of the segments 110 is not more than double. That is, because both end portions 142 of the module are already in a double overlapped state due to overlap with its neighboring module, both end portions 142 of the module may be in quadruple overlapped state when the folding angle of the module 120 is set more acutely. As a result, the degree of the tube-like deployable structure 100 in the Z-axial direction is reduced because of the quadruple overlapping. Therefore, by setting the folding angle of the module 120 according to that above-described, the packaging efficiency of the tube-like deployable structure 100 as a whole in three dimensional point of view is higher.

The present invention is not limited to the tube-like deployable structure 100 according to the first embodiment. Obviously, many modifications and variations of the present invention in light of the above teaching may be made. It is, therefore, to be understood that, within the scope of the appended claims, the invention may be practiced otherwise than as specifically described.

The shape of the tube-like deployable structure 100 is cylindrical which is approximately a circle, i.e., a polygon having sides which are approximately the same length, in plane, and which polygon is straight when extended in the Z-axial direction, according to the first embodiment. However, the tube-like deployable structure may have another shape of polygon other than the approximately circle in plane. The axis of the deployable structure is not limited to the straight line. The axis may be a curve or the like. A combination of connecting segments is not limited to that above-described. The segments can be connected in various combination. For example, the segments may be folded in the closing pattern and the opening pattern alternately in the direction of the closed curve. The segments may be also folded in opening pattern continuously and closing pattern continuously without alternating with each other The number of the opening pattern and the closing pattern may be different from each other.

However, it is required to continue the same pattern, i.e., the closing pattern and the opening pattern do not alternate with each other, in the direction of the central axis. As the result, it is possible to smoothly fold the side wall as a whole.

A deployable structure according to a second embodiment of the invention will be explained with reference to FIGS. 7 to 10, as follows.

Figure 7:
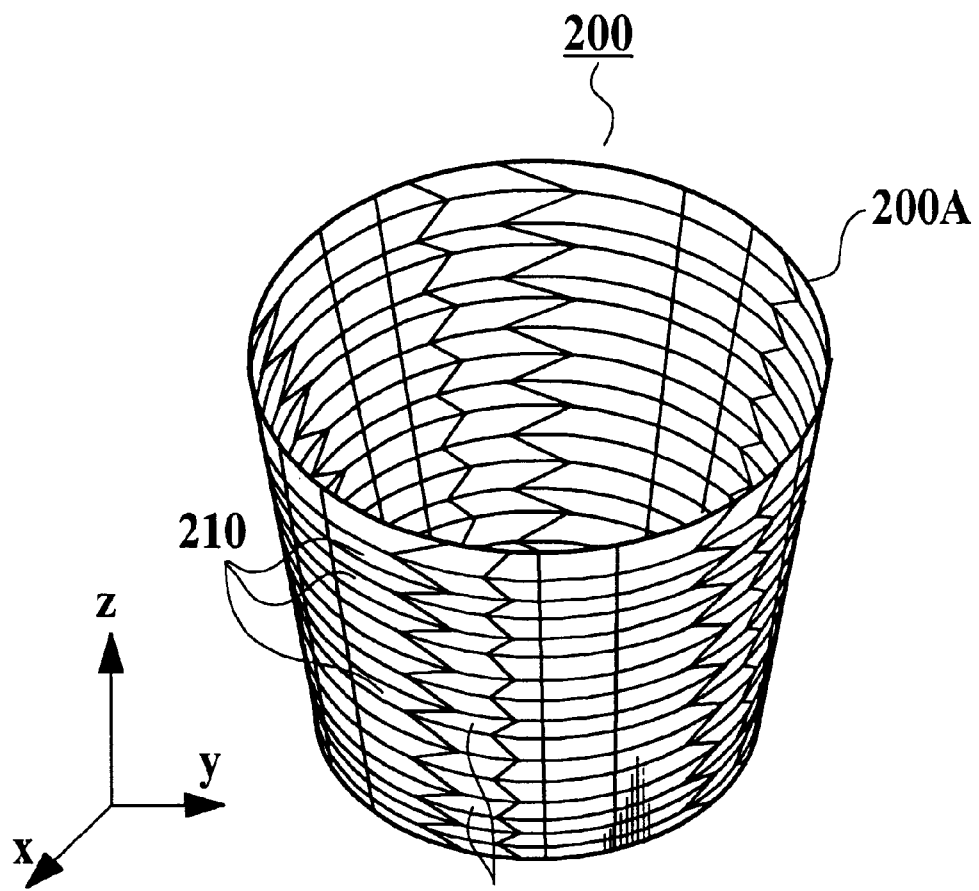
FIG. 7 is a perspective view of a tube-like deployable structure in a development state according to a second embodiment of the present invention.
Figure 8:
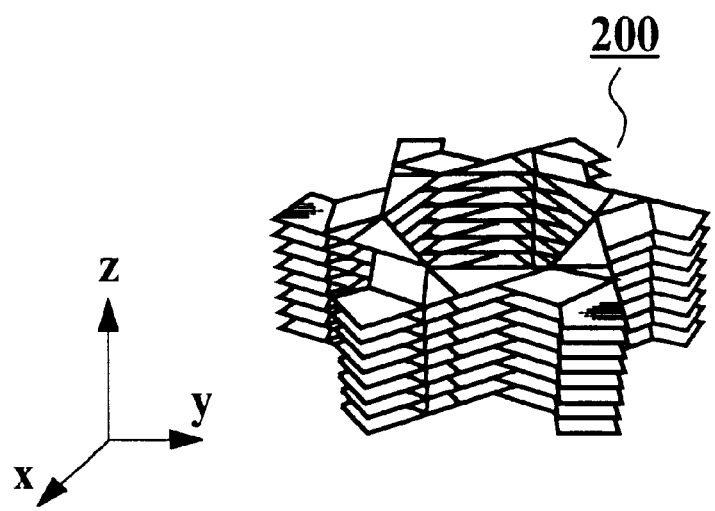
FIG. 8 is a perspective view of the tube-like deployable structure shown in FIG. 7, in a packaged state.
Figure 9:
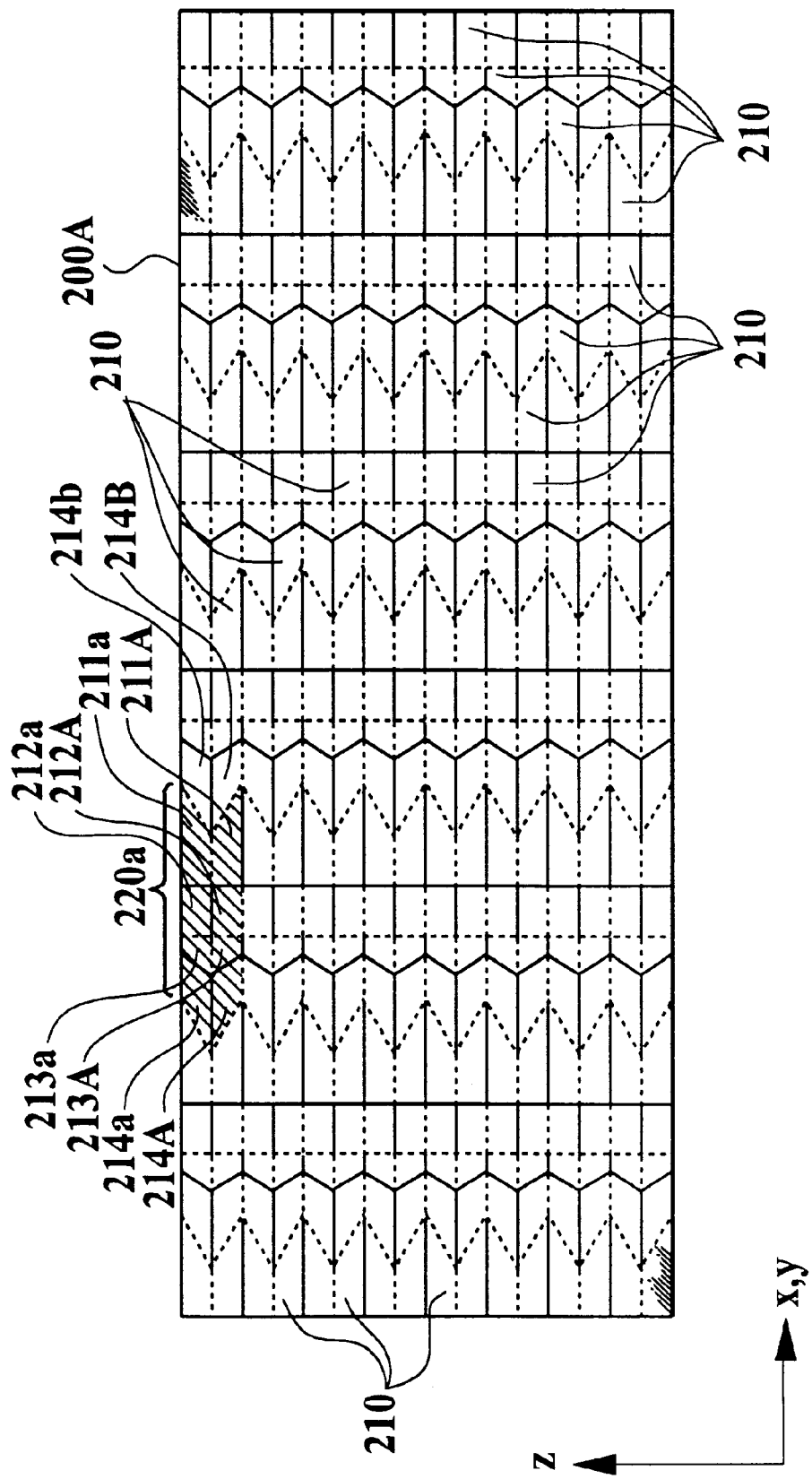
FIG. 9 is a plan development of the tube-like deployable structure shown in FIG. 7, for explaining folds thereof.
Figure 10:
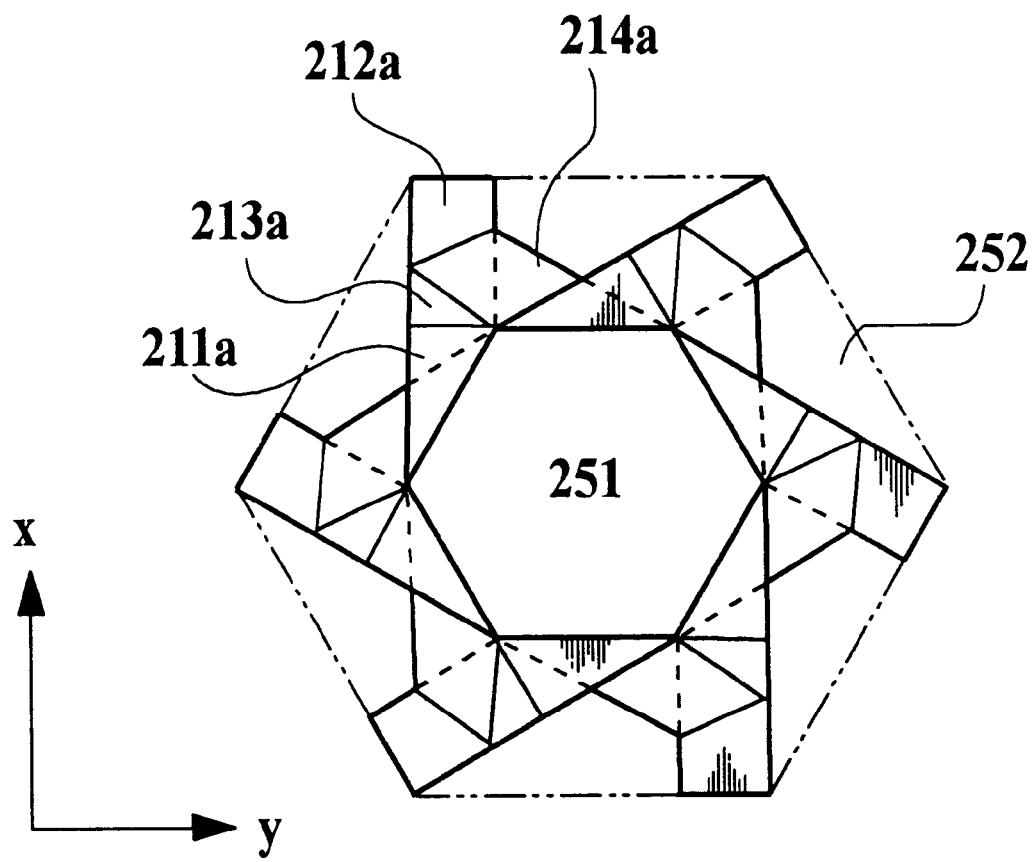
FIG. 10 is a top view of the tube-like deployable structure shown in FIG. 7, in a most packaged state.

FIG. 7 is a perspective view of a tube-like deployable structure 200 in a development state according to the second embodiment of the present invention, FIG. 8 is a perspective view of the tube-like deployable structure 200 in a packaged state, FIG. 9 is a plan development of the tube-like deployable structure 200, for explaining folds (creases) formed on the wall thereof, and FIG. 10 is a top view of the tube-like deployable structure 200 in a most packaged state. Dotted lines, which are parallel with the Z-axis, show the opening patterns in the connecting portions, while solid lines, which are parallel with the Z-axis, show the closing patterns in the connecting portions, as shown in FIG. 9. The opening patterns alternates with the closing patterns, in parallel with the Z-axis. The folding state in FIG. 10 is an ideal state and does not take into account a function of overlapping of the segments 210. Accordingly, the degree of folding of the tube-like deployable structure 200 in practice is slightly lower than that of the ideal state thereof by overlapping of the segments 210.

The tube-like deployable structure 200 is for forming a closed area which is surrounded by a side wall 200A, for example, in space, on the surface of the moon, on the earth, or the like. The closed area is not only a completely closed area but also a semi-closed area which is open at both axial ends, i.e., at upper and lower ends, of the tube-like deployable structure 200.

The tube-like deployable structure 200 according to the second embodiment comprises a plurality of ring-shaped units which are successively connected one after another in the Z-axial direction. Each unit comprises six modules 220a which are successively connected in a circumferential direction in parallel with the X-Y-plane, as shown in FIG. 7. The module 220a comprises eight segments 211a, 211A, 212a, 212A, 213a, 213A, 214a and 214A each of which has the shape of a quadrangle, and which are connected one another, as shown in FIG. 9. Each module 220a can be folded along connecting creases thereof. First segments 211a and 211A, second segments 212a and 212A, third segments 213a and 213A, and fourth segments 214a and 214A are arranged to form a matrix of 2×4 and two rows along the circumferential direction on the X-Y-plane, as shown in FIGS. 7 and 9. The module 220a is folded in the closing pattern which reduces the inner angle between the circumferential creases of the first segments 211a and 211A and the second segments 212a and 212A, and also the third segments 213a and 213A and the fourth segments 214a and 214A in the inner side of the ring unit in parallel with the X-Y-plane, while the module 220a is folded in the opening pattern which enlarges the inner angle between the circumferential sides of the second segments 212a and 212A and the third segments 213a and 213A, accompanied with a folding in the Z-axial direction. Adjacent four segments of the two adjacent modules in the circumferential direction, that is, the fourth segments 214b and 214B of one module which is connected to the first segments 211a and 211A of the other module are folded in the opening pattern, accompanied with a folding in the Z-axial direction.

By folding the connecting creases of the segments 210 in both Z-axial and radial directions of the side wall 200A simultaneously, it is possible to package the tube-like deployable structure 200 from approximately tube-like shape in the development state as shown in FIG. 7 to the packaged state which is minimized in the Z-axial and the radial directions of the side wall 200A on the X-Y-plane, as shown in FIG. 8.

When the tube-like deployable structure 200 is in its most folded state in the Z-axial direction, the folding angle in the closing pattern between the first segments 211a and 211A and the second segments 212a and 212A, of the module 220a is set for approximate minimum, e.g., 00 to 100. Accordingly, the second segments 212a and 212A are approximately overlapped with the first segments 211a and 211A, as shown in FIG. 10. The folding angle in the opening pattern between the second segments 212a and 212A and the third segments 213a and 213A, of the module 220a is set for approximate maximum, e.g., 350 degrees to 360 degrees. Accordingly, the third segments 213a and 213A are approximately overlapped with the second segments 212a and 212A, as shown in FIG. 10.

An inner excess space 251 is created in the inner of the tube-like deployable structure 200 and outer excess spaces 252 are created around outer circumferential portions of the tube-like deployable structure 200, in the packaged state thereof. Although these excess spaces 251 and 252 are otherwise useless voids, they do accommodate the tube-like deployable structure 200 when packaged. Hence, these excess spaces 251 and 252 are sure to be created.

As described above, according to the tube-like deployable structure 200 of the second embodiment, because the tube-like deployable structure 200 is folded in the radial direction accompanying the folding thereof in the Z-axial direction, i.e., in a direction of a determined axis, it is possible to carry out three-dimensional deployment and packaging of the tube-like deployable structure 200. As a result, it is possible to enlarge a degree of the deployment and packaging, of the tube-like deployable structure 200. Therefore, it is possible to make use of spaces efficiently, when the tube-like deployable structure 200 is transported, or otherwise temporarily stored in an accommodating space or the like, for example.

Further, according to the tube-like deployable structure 200 of the second embodiment, because the second segments 212a and 212A are approximately overlapped on the first segments 211a and 211A and the third segments 213a and 213A are approximately overlapped on the second segments 212a and 212A when the tube-like deployable structure 200 is packaged in the Z-axial direction, it is possible to reduce the perimeter of the side wall 200A. As a result, it is possible to reduce the length in the radial direction of the side wall 200A due to the overlapping of the segments above-described.

Furthermore, because the reduction in the radial direction above-described is carried out not by pushing the segments 210 into a center portion of the tube-like deployable structure 200 but by folding to overlap some segments 210, it is possible to reduce the outer excess spaces 252 and to ensure the large inner excess space 251.

The tube-like deployable structure of the invention may form several types of packages. The types and a classification, of the tube-like deployable structure will be explained with reference to FIGS. 11 to 18, as follows.

Figure 11:
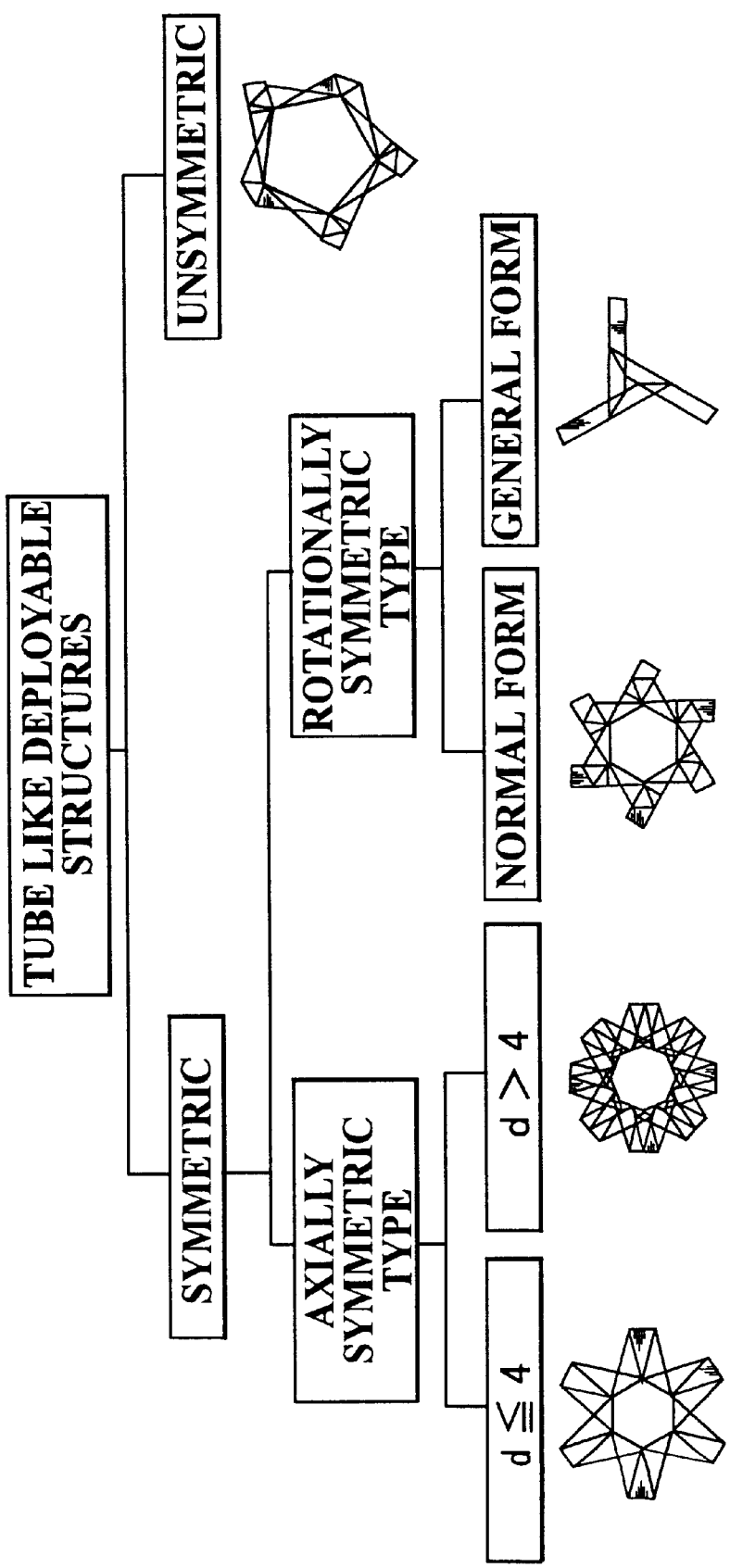
FIG. 11 is a diagram of a classification of the tube-like deployable structure of the invention.

FIG. 11 is a diagram of the classification of the tube-like deployable structure of the invention.

The tube-like deployable structure of the present invention can be divided into symmetric and unsymmetric types according to the shape of the tube-like deployable structure in packaged state, as shown in FIG. 11. The symmetric type of the tube-like deployable structure can be further divided into two types, one is an axially symmetric type and the other is a rotationally symmetric type. The axially symmetric type has a shape which is axially symmetric against an axis which intersects to the center of the ring units and is perpendicular to the central axis of the ring units looking in the central axis of the tube-like deployable structure when the tube-like deployable structure is in the packaged state. The rotationally symmetric type has a shape which is rotationally symmetric around the central axis when the tube-like deployable structure is in the packaged state.

At first, the axially symmetric type will be explained with reference to FIGS. 12 to 16, as follows.

The axially symmetric type is divided into two types according to the maximum number $d_{max}$ of the overlapped segments. One type has not more than four overlapped segments, and the other type has more than four overlapped segments. The maximum number $d_{max}$ of the overlapped segments shows the number of overlapped segments for one unit when the tube-like deployable structure is in the packaged state.

The case where the maximum number $d_{max}$ of the overlapped segments is not more than four will be explained as follows.

Figure 12:
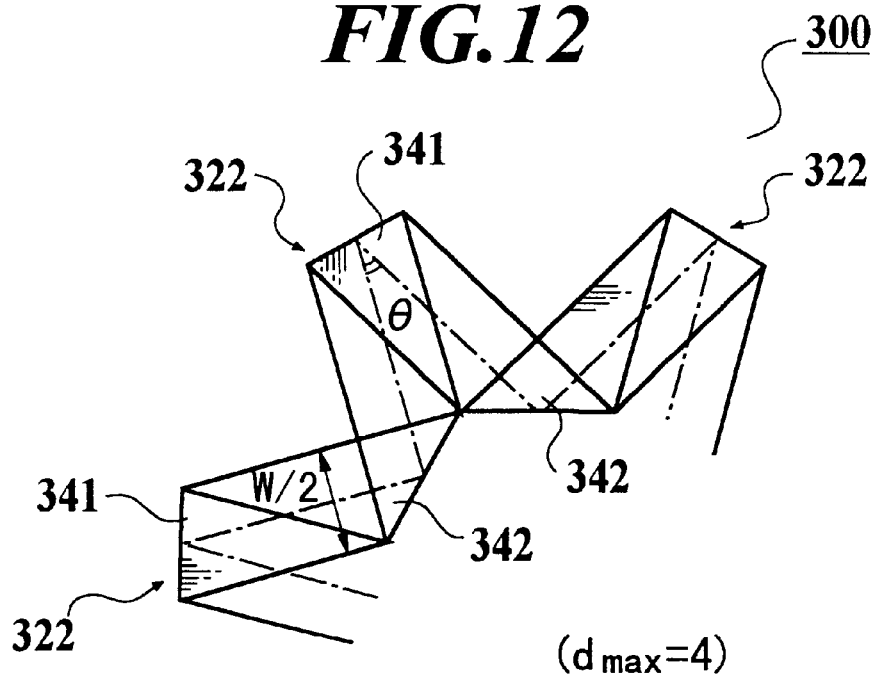
FIG. 12 is a partial plan view of the tube-like deployable structure, according to an embodiment of an axially symmetric type of the invention, wherein a maximum number of overlapped segments thereof is not more than four, the view showing parameters.

To reduce a thickness of the overlapped portions of the tube-like deployable structure, the maximum number $d_{max}$ of the overlapped segments is limited to four for one unit, as shown in FIG. 12. The tube-like deployable structure 100 according to the first embodiment of the invention belongs to this type, as shown in FIG. 5. In this case where the maximum number $d_{max}$ of the overlapped segments is limited to four for one unit, it has the geometrical properties described as follows.

Reference letter W denotes a width of a unit of the tube-like deployable structure, reference letter K denotes a number of apexes 322 thereof, and reference letter θ denotes an angle of the apexes 322. The apexes 322 project to the outer of the tube-like deployable structure when the tube-like deployable structure is in the packaged state, as shown FIG. 12. The width W of a unit is expressed in terms of the number K of apexes 322 and the angle θ of the apexes 322 as represented by the following equation [Math 1]:

$$W/R_0 = \frac{4\pi}{k}\sin\frac{\theta}{2}\sec\frac{\pi}{k}\cos\frac{2\pi + k\theta}{2k}, \quad (k \geq 3) \quad \text{[Math 1]}$$

wherein $R_0$ is a radius of the side wall of the deployable structure-in the development state.

Figure 13:
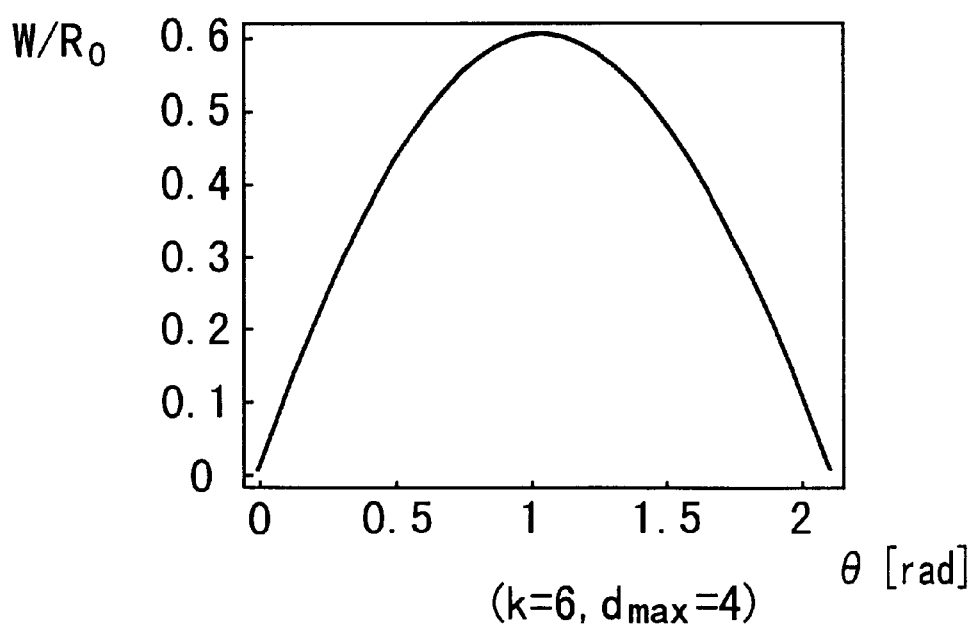
FIG. 13 is a graphical representation showing a relationship between non-dimensional width W/Ro and an angle θ of the apexes, of the tube-like deployable structure of the invention, which is an axially symmetric type wherein a maximum number of overlapped segments thereof is not more than four.

FIG. 13 is a graphical representation showing a relationship between non-dimensional width $W/R_0$ and the angle θ of the apexes 322 when the number of apexes 322 is six. When the angle θ of the apex is π/3, the non-dimensional width becomes the maximum value, as shown in FIG. 13, so that the number of units is reduced.

The radius R of the packaged side wall is the most important parameter for evaluating the packaging efficiency of the tube-like deployable structure. That is, the smaller a ratio $R/R_0$ of the radiuses of the packaged/developed tube-like deployable structure becomes, the higher the packaging efficiency of the tube-like deployable structure becomes. Equation [Math 2] shows a ratio $R/R_0$ of the radiuses of the packaged/developed tube-like deployable structure. The number K of the apexes and the angle θ of apex are parameters in the equation [Math 2].

$$R/R_0 = \frac{\pi}{k}\cos\left(\frac{\pi-\theta}{2} - \frac{\pi}{k}\right)\tan\left(\frac{\pi}{2} - \frac{\pi}{k}\right) + \quad \text{[Math 2]}$$
$$\frac{\pi}{k}\tan\frac{\pi}{k}\tan\frac{\theta}{2}\cos\frac{2\pi + k\theta}{2k}, \quad (k \geq 3)$$

wherein R is a radius of the packaged tube-like deployable structure.

Figure 14:
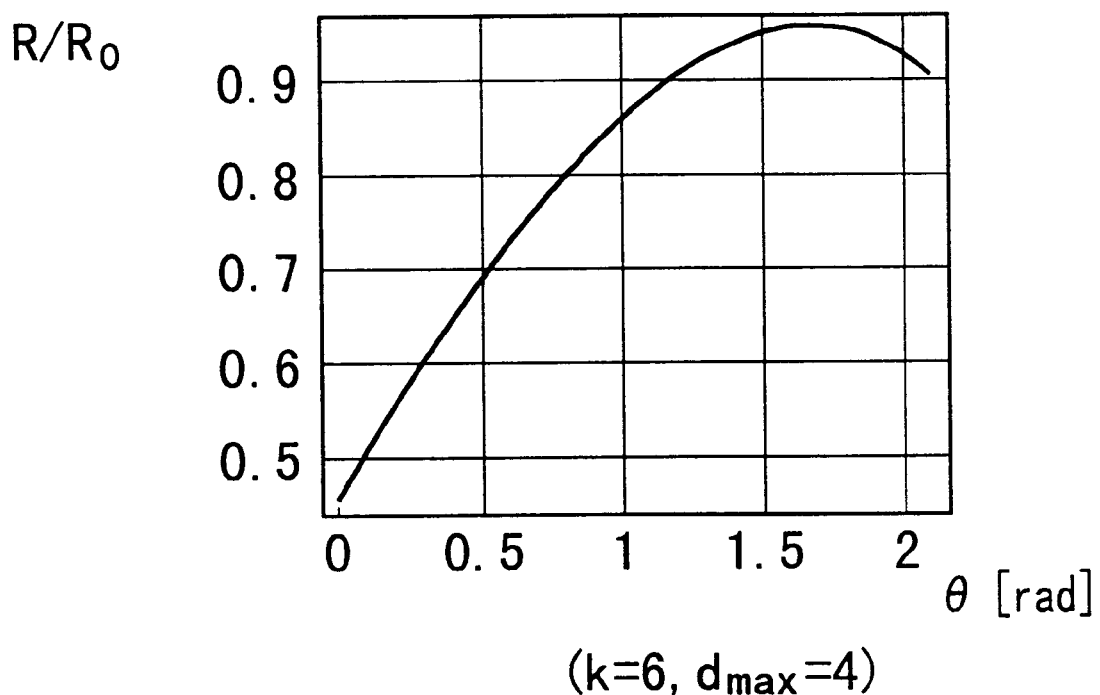
FIG. 14 is a graphical representation showing a relationship between the ratio R/Ro of radius of the packaged and developed tube-like deployable structure and the angle θ of the apexes, of the tube-like deployable structure of the invention, which is an axially symmetric type wherein a maximum number of overlapped segments thereof is not more than four.
Figure 15:
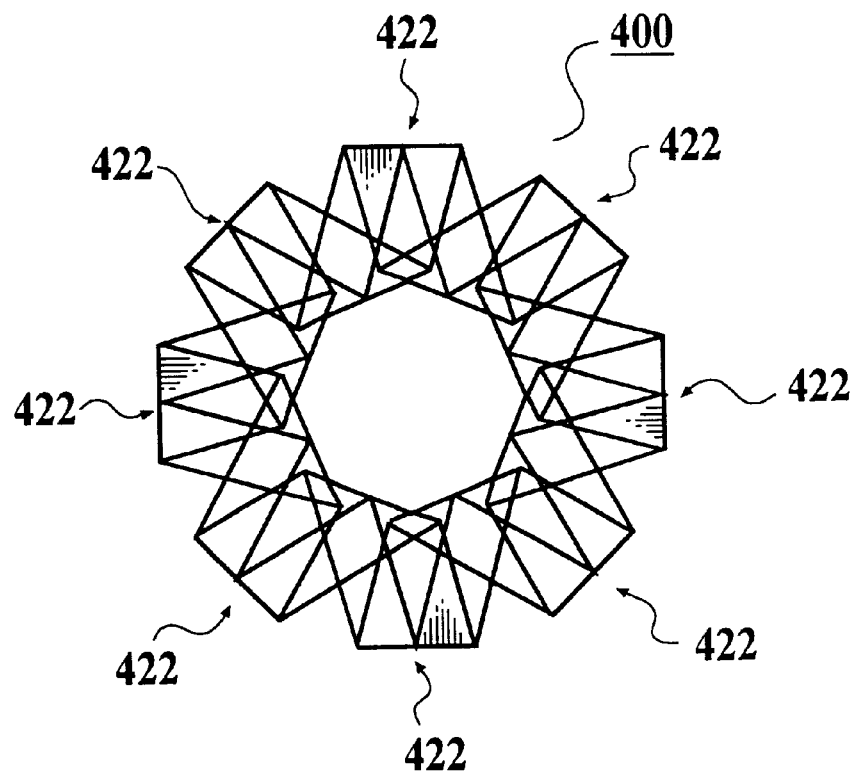
FIG. 15 is a plan view of a tube-like deployable structure in a packaged state, according to an embodiment of the axially symmetric type of the invention, wherein the maximum number of the overlapped segments is eight.

FIG. 14 is a graphical representation showing a relationship between the ratio $R/R_0$ of the radius of the packaged/developed tube-like deployable structure and the angle 19 of the apexes 322 when the number of apexes 322 is six.

According to the tube-like deployable structure which is the axially symmetric type and the maximum number $d_{max}$ of the overlapped segments is not more than four, because the maximum number $d_{max}$ of the overlapped segments is limited to not more than four, it is possible to reduce the thickness of the overlapped portions of the tube-like deployable structure.

The case where the maximum number $d_{max}$ of the overlapped segments is more than four will be explained as follows.

When the axially symmetric type of the tube-like deployable structure has more than four overlapped segments for one unit, it is possible to further reduce the radius R of the package tube-like deployable structure compared to that of the tube-like deployable structure which has not more than four overlapped segments for one unit.

Figure 16:
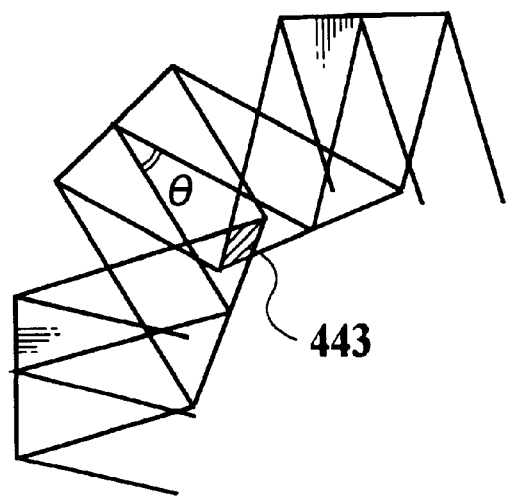
FIG. 16 is a partially enlarged view of the tube-like deployable structure of the invention, shown in FIG. 15.

FIG. 5 is a plan view of a tube-like deployable structure 400 in a packaged state, which is the axially symmetric type and the maximum number $d_{max}$ of the overlapped segments is eight. FIG. 16 is a partially enlarged view of the tube-like deployable structure 400 shown in FIG. 15.

The tube-like deployable structure 400 has such a value of the parameter, wherein the number K of the apex 422 is eight, the angle θ of the apexes 422 is π/5, and the maximum number $d_{max}$ of the overlapped segments is eight. Reference numeral 443 denotes an area that eight segments are overlapped for one unit, as shown in FIG. 16.

According to the tube-like deployable structure which is the axially symmetric type and the maximum number $d_{max}$ of the overlapped segments is more than four, and because the maximum number $d_{max}$ of the overlapped, segments is more than four, it is possible to reduce the radius R of the packaged tube-like deployable structure.

Next, the tube-like deployable structure which is the rotationally symmetric type will be explained with reference to FIGS. 17 and 18, as follows.

The rotationally symmetric type is divided into two types. One type is a normal form of the rotationally symmetric type. The other type is a general form of the rotationally symmetric type, as shown in FIG. 11. The tube-like deployable structure 200 according to the second embodiment of the invention above-described belongs to the normal form of the rotationally symmetric type, as shown in FIG. 10. The tube-like deployable structure which is the rotationally symmetric type comprises inside edges and outside edges, as shown in FIGS. 17 and 18.

Figure 17:
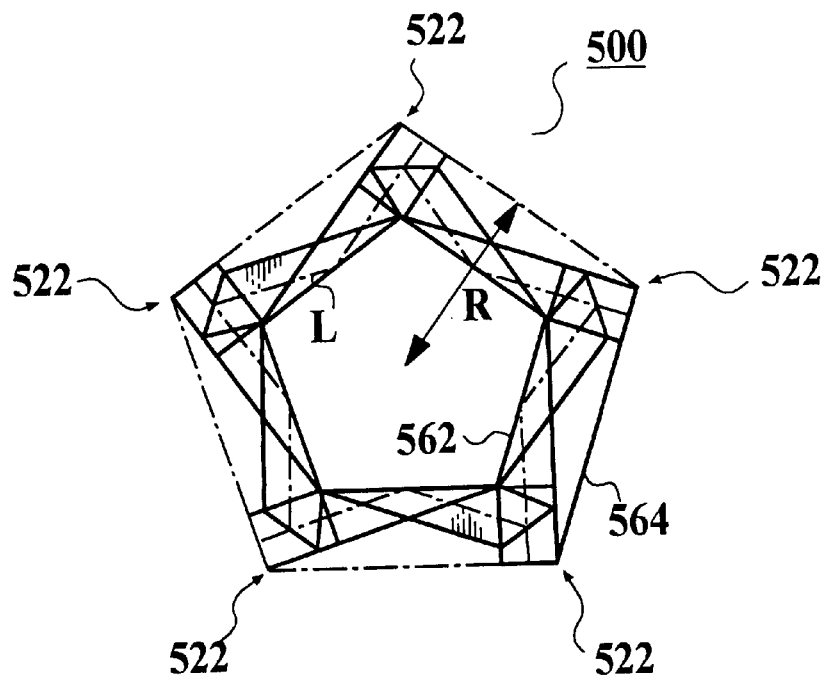
FIG. 17 is a plan view of the tube-like deployable structure in the packaged state, according to an embodiment of the normal form of rotationally symmetric type of the invention.

FIG. 17 is a plan view of the tube-like deployable structure 500 in the packaged state, which is the normal form of the rotationally symmetric type, according to an embodiment. The normal form of the rotationally symmetric type has the inside edges 562 and the outside edges 564, which are parallel to each other. The tube-like deployable structure 500 which is the normal form of the rotationally symmetric type has a higher packaging efficiency thereof than that of the general form of the rotationally symmetric type.

Reference letter L denotes an length of a edge of apex 522, which is illustrated with the solid line, as shown in FIG. 17. The angle θ of the apexes 522 is represented by the number K of apexes 522, and the length L of edge of the apex is represented by the number K of apexes, as represented by the following equation [Math 3]:

$$L/R_0 = \frac{\pi}{k\left(1 + 2\cos\frac{2\pi}{k}\right)}, \quad (k \geq 5) \quad \text{[Math 3]}$$

Non-dimensional width $W/R_0$ of the unit is shown in the number K of apex 522 as represented by the following equation [Math 4]:

$$W/R_0 = \frac{4\pi}{k\left(1 + 2\cos\frac{2\pi}{k}\right)}\sin\frac{k}{2}\sec\frac{\pi}{k}\cos\frac{2\pi}{k}, \quad (k \geq 5) \quad \text{[Math 4]}$$

The ratio $R/R_0$ of the radius of the packaged/developed tube-like deployable structure which is the normal form of the rotationally symmetric type Ls shown in the number K of apex 522, as represented by the following equation [Math 5]:

$$R/R_0 = \frac{\pi}{k}, \quad (k \geq 5) \quad \text{[Math 5]}$$

According to the tube-like deployable structure, which is the normal form of the rotationally symmetric type, because the tube-like deployable structure has the inside edges 562 and the outside edges 564 parallel to each other, it is possible to have a higher packaging efficiency of the tube-like deployable structure than that of the general form of the rotationally symmetric type. This reduces the outer excess spaces, and ensures the large inner excess space.

Figure 18:
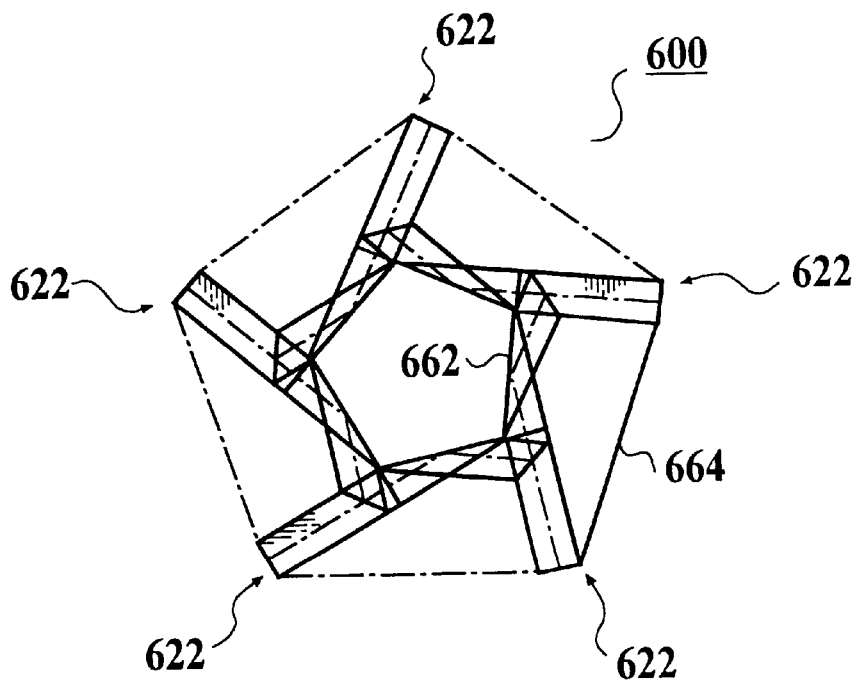
FIG. 18 is a plan view of a tube-like deployable structure in the packaged state according to an embodiment of the general form of rotationally symmetric type of the invention.

FIG. 18 is a plan view of a tube-like deployable structure 600 in the packaged state, according to the embodiment of the general form of the rotationally symmetric type. The tube-like deployable structure 600 which is the general form of the rotationally symmetric type comprises the inside edge 662 and the outside edge 664, which are not parallel with each other. A plurality of parameters determine the shapes of the tube-like deployable structure which is the general form of the rotationally symmetric type. The tube-like deployable structure which is the general form of the rotationally symmetric type has a redundancy for variable packaging requirement by changing the values of the plurality of parameters. This is the most characteristic feature thereof.

According to the tube-like deployable structure of the invention, which is the general form of the rotationally symmetric type, because the tube-like deployable structure has a plurality of parameters which determine the shapes of the tube-like deployable structure, it is possible to have the redundancy for variable packaging requirement.

Figure 19:
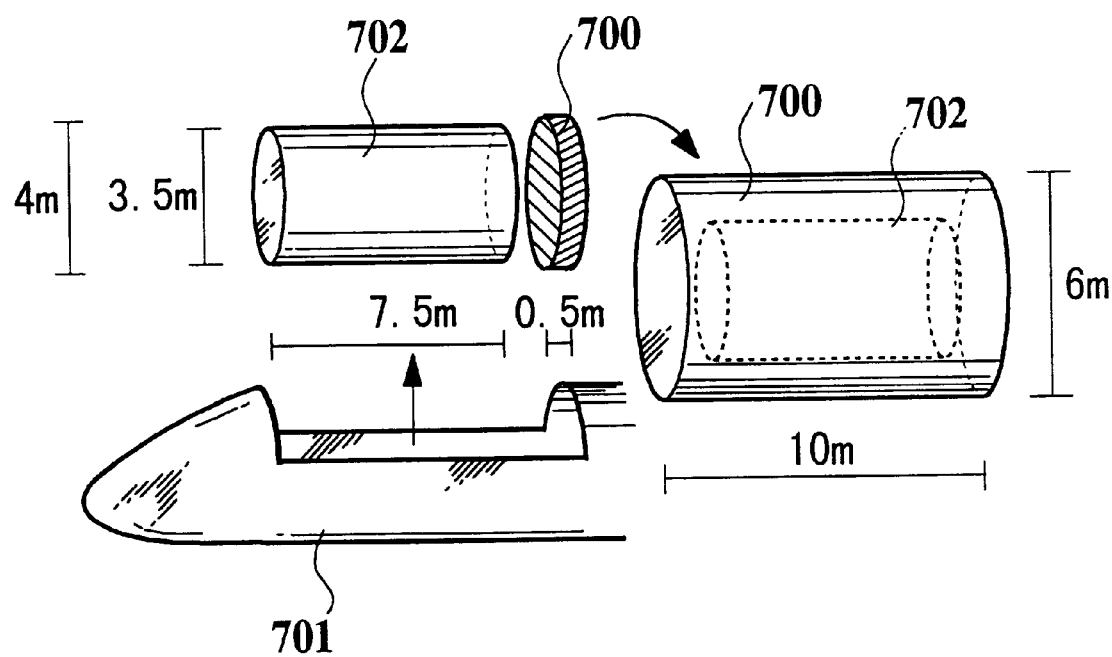
FIG. 19 is a schematic illustration of the tube-like deployable structure according to the third embodiment of the invention.

Next, a deployable structure according to a third embodiment of the invention will be explained with reference to FIG. 19, as follows.

The tube-like deployable structure can be applied as a dust shield which protects the space systems from space debris and meteoroids. FIG. 19 is a schematic illustration of the tube-like deployable structure according to the third embodiment of the invention. Reference numeral 700 denotes the tube-like deployable structure, reference numeral 701 denotes a space shuttle, and reference numeral 702 denotes the space systems which is required to be protected from space debris or the like.

When the tube-like deployable structure 700, which is the axially symmetric type and the maximum number $d_{max}$ of the overlapped segments is four for one unit, is applied as the dust shield, the geometrical parameters are determined the by equations [Math 1] and [Math 2]. When a diameter 2R in the developed state is assumed to be 6 meters, a length in the direction of the central axis in the developed state is assumed to be 10 meters, and the number K of apexes in the packaged state is assumed to be 6, of the tube-like deployable structure 700. Other geometrical parameters, i.e., a width W of a unit, an angle θ of apex, and a number of units are determined as follows, W=0.85[m], θ=0.3[rad], number of units=12.

According to the tube-like deployable structure of the third embodiment of the invention, because it is possible to carry out the three-dimensional packaging and development of the tube-like deployable structure, it is possible to construct a structure in a short period in space.

In the third embodiment, although the tube-like deployable structure is applied as the dust shield in space, the present invention is not limited to this. For example, the tube-like deployable structure can be applied for a lunar base structure which is constructed in the cave of the moon. The size of entrance of the cave is generally smaller than that of interior of the cave. Accordingly, the tube-like deployable structure is passed through the entrance in the packaged state. Thereafter, the tube -like deployable structure is developed in the interior of the cave. Therefore, it is possible to construct the lunar base structure in the interior of the cave in a short period.

As described above, according to the deployable structure of the invention, because the deployable structure is folded in the directions of the central axis and radius of the side wall, it is possible to carry out the three-dimensional deployment and packaging of the deployable structure. As a result, it is possible to enlarge the degree of the deployment and packaging of the deployable structure as a whole. Therefore, it is possible to make use of spaces efficiently, when the deployable structure is transported, or otherwise temporarily stored in an accommodating space or the like, for example.

Further, according to the deployable structure of the invention, when the folding angle of the module is set to make both end portions of the module approximately contact each other at a point, that is, both end portions of the module are not overlapped with each other, it is possible to prevent the quadruple overlapping of the segments, and it is possible to minimize the length in the radial direction of the side wall in the packaged state. Therefore, it is possible to make the packaging efficiency of the deployable structure high as a whole.

According to the deployable structure of the invention, when the folding angle between the first segments and the second segments is set for maximum, because the second segments and the first segments are overlapped with each other, it is possible to reduce the length in the radial direction of the side wall, resulting in reduction of the circumferential length of the side wall. As a result, it is possible to make the packaging efficiency of the deployable structure in the radial direction high as a whole in particular. Further, because the reduction in the radial direction above-described is carried out not by pushing the segments into a center portion of the deployable structure but by folding to overlap some segments, it is possible to obtain the relatively large inner space.

According to the tube-like deployable structure which is of the axially symmetric type and the maximum number $d_{max}$ of the overlapped segments is not more than four, and because the maximum number $d_{max}$ of the overlapped segments is limited to not more than four, it is possible to reduce the thickness of the overlapped portions of the tube-like deployable structure.

According to the tube-like deployable structure which is of the axially symmetric type and the maximum number $d_{max}$ of the overlapped segments is more than four, and because the maximum number $d_{max}$ of the overlapped segments is more than four, it is possible to reduce the radius of the packaged tube-like deployable structure.

According to the tube-like deployable structure which is the normal form of the rotationally symmetric type, because the tube-like deployable structure has the inside edge and the outside edge parallel to each other, it is possible to have the higher packaging efficiency of the tube-like deployable structure than that of the general form of the rotationally symmetric type, which reduces the outer excess spaces and ensures the large inner excess space.

According to the tube-like deployable structure of the invention, which is the general form of the rotationally symmetric type, because the tube-like deployable structure has a plurality of parameters which determine the shapes of the tube-like deployable structure, it is possible to have redundancy for variable packaging requirements.

The entire disclosure of Japanese Patent Application No. 9-333154 filed on Dec. 3, 1997 including specification, claims, drawings and summary are incorporated herein by reference in its entirety.

What is claimed is:

1. A tube-like deployable structure being foldable as a whole, the structure comprising:
   a side wall having a tube-like shape defined by a locus of a closed curve moved along an axis, and comprising a plurality of segments foldable in directions of the axis and the closed curve;
   wherein connecting creases of at least four adjacent segments are connected with one another at one point, the at least four adjacent segments having two patterns of folding, one of which is a closing pattern where the segments are folded to reduce an inner angle between connecting sides of segments adjacent each other in a circumferential direction on the closed curve as accompanied with a folding in the axial direction, another pattern of which is an opening pattern where the segments are folded to enlarge the inner angle between connecting sides of segments adjacent each other on the closed curve, as accompanied with a folding in the axial direction and the side wall being deployed and folded in the axial direction and radially in a direction of a plane by folding the segments according to the closing pattern and opening pattern with the closed curve being in a continuously closed configuration, wherein the diameter of the non-deployed structure is less than the diameter of the deployed structure.

2. A tube-like deployable structure as claimed in claim 1, wherein the closed curve comprises an approximately circular shape.

3. A tube-like deployable structure as claimed in claim 1, wherein the opening pattern and the closing pattern are alternating with each other in the direction of the continuously closed curve.

4. A deployable structure as claimed in claim 1, wherein the closing pattern and the opening pattern are continued in the direction of the central axis, respectively.

5. A tube-like deployable structure as claimed in claim 1, wherein the axis is a straight line.

6. A tube-like deployable structure as claimed in claim 1, wherein each segment comprises a quadrangular shape.

7. A tube-like deployable structure as claimed in claim 1, wherein the side wall comprises modules of a determined number of connected segments, the modules being connected to one another in the axial direction and in a radial direction of the continuously closed curve;
   each module having four segments folded by the closing pattern, wherein two adjacent segments in the direction of the closed curve have an approximately same length relative to each other in the direction of the closed curve; and
   when the side wall is folded in the direction of the axis, the respective modules are also folded to have an angle so that segments of the respective modules in the direction of the closed curve are brought into contact with each other, when the tube-like deployable structure is viewed from the direction of the axis when the tube-like deployable structure is folded in its smallest state.

8. A deployable structure as claimed in claim 7, wherein the module comprises four segments and is folded in a closing pattern manner, and two segments adjacent in the circumferential direction comprise an approximately same length to each other in the circumferential direction.

9. A tube-like deployable structure as claimed in claim 1, wherein the side wall comprises modules having a determined number of connected segments, the modules are connected to one another in the direction of the axis and in the direction of the closed curve, the module comprises a portion wherein first to third segments are connected to each other in the direction of the closed curve to make two rows in the direction of the axis, the first segments and the second segments are folded by the closing pattern, while the second segments and the third segments are folded by the opening pattern, and when the side wall is folded in the direction of the axis, the first segments and the second segments are folded so that the second segments are approximately overlapped with the first segments.

10. A tube-like deployable structure as claimed in claim 1, wherein the side wall comprises at least one unit having a ring shape, in which determined number of modules are connected.

11. A tube-like deployable structure as claimed in claim 10, wherein the deployable structure comprises a shape which is symmetric about the axis when the deployable structure is in a folded state when the tube-like deployable structure is viewed from the direction of the axis and a maximum number of overlapping of the segments is not more than four for one unit.

12. A tube-like deployable structure as claimed in claim 10, wherein the deployable structure comprises a shape which is symmetric about the axis when the deployable structure is in a folded state when the tube-like deployable structure is viewed from the direction of the axis and a maximum number of overlapping of the segments is more than four for one unit.

13. A tube-like deployable structure as claimed in claim 10, wherein the deployable structure comprises a shape which is symmetric about the axis of the deployable structure when the deployable structure is in a folded state.

14. A deployable structure as claimed in claim 1 is applied as a dust shield which protect a space system.

* * * * *